(12) United States Patent
Mazza

(10) Patent No.: US 7,677,034 B1
(45) Date of Patent: Mar. 16, 2010

(54) POWER CONVERSION SYSTEM

(76) Inventor: Gerald P. Mazza, 37970 70th Ave. North, Pinellas Park, FL (US) 33781

( * ) Notice: Subject to any disclaimer, the term of this patent is extended or adjusted under 35 U.S.C. 154(b) by 107 days.

(21) Appl. No.: 11/900,362

(22) Filed: Sep. 11, 2007

Related U.S. Application Data

(63) Continuation-in-part of application No. 10/944,654, filed on Sep. 20, 2004, now abandoned.

(51) Int. Cl.
*F16D 31/02* (2006.01)
*F16H 29/20* (2006.01)

(52) U.S. Cl. ......................... 60/374; 74/89.11
(58) Field of Classification Search ............... 60/369, 60/374, 419, 484, 486; 74/89.11, 111
See application file for complete search history.

(56) References Cited

U.S. PATENT DOCUMENTS

| | | | | | |
|---|---|---|---|---|---|
| 1,132,331 | A | * | 3/1915 | Gebhardt | 60/419 |
| 3,956,893 | A | * | 5/1976 | Putnal | 60/484 |
| 4,633,723 | A | * | 1/1987 | Masovich et al. | 74/141.5 |
| 4,899,606 | A | * | 2/1990 | Harris | 74/89.17 |

* cited by examiner

*Primary Examiner*—Michael Leslie

(57) ABSTRACT

A diesel engine with an associated rotary pump pumps a fluid in a path of travel. A linear cylinder motor oscillates a disc. First and second multi stage cylinder pumps with associated attachment members operate in response to the movement of the disc. A hydraulic motor with a generator and pressure tank has a line for feeding fluid. An electric motor with a pressure tank and lines feeds fluid from the multi stage cylinder pumps to the pressure tank and feeds fluid from the pressure tank to the generator for powering the generator.

1 Claim, 2 Drawing Sheets

POWER CONVERSION SYSTEM

RELATED APPLICATION

The present invention is a continuation-in-part of pending U.S. patent application Ser. No. 10/944,654 filed Sep. 20, 2004 now abandoned, the subject matter of which is incorporated herein by reference and the priority of which is hereby claimed.

BACKGROUND OF THE INVENTION

1. Field of the Invention

The present invention is a power conversion system which is endowed with a "changing mechanical advantage". The movable fulcrum is an important part of the disc or circle lever and is used to provide changing force velocities, one force being uniform and one force being of variable velocity. Also by modification of the points of application both Effort and Resistance forces can be of variable velocity.

2. Description of the Prior Art

Conventional mechanical power conversion systems of today are basically an assortment of "levers or simple machines". All have various configurations and combinations with their input and output forces typically of a constant "uniform velocity".

The present invention's configuration is fashioned primarily like a "circle or disc lever". The disc and its given movable fulcrum arc segment set upright like a wheel on a road ready to rock to and fro on its tangent support base. In one of the preferred modifications, the disc lever rocks to and fro 8.113 degrees on its support base and has the shape and workings with a movable fulcrum. Its fulcrum arc segment has small ring gear teeth matching the teeth on support base rack teeth. The meshing of the teeth keeps translation of the rolling fulcrum arc from occurring on rack support base when Effort and Resistance forces are applied to the disc gear.

This new disc lever arrangement has the capacity which makes available an efficient variable output force in a certain given distance and or time cycle. Its value is based on an output force supplied from a single disc unit of which its E and R forces are moving seeking equilibrium or place of rest. When this place of rest is found motion stops and changes direction. A normal procedure is to series compound these variable R output forces. This is accomplished by the use of several discs units coupled together with their E and R forces compounded hydraulically in a series. These discs are lined up together in a row like a roll of coins rolling the same measured distance to and fro on their sides with spaces for parts and connections in between them while series compounding is occurring. The Effort and Resistance input and output forces are piped together hydraulically in a progressive E to R fashion. Thus connecting and progressively compounding the E to R forces, at each and every disc levers points of input and output. This includes compounding of the forces in the series from the first to the last discs. This provides an output force. As the plurality of discs all roll together simultaneously the same distance in the same overall time, an output force is accomplished in this manner and within a relatively small space.

Importantly with motion, the various disc unit modifications hydraulically have their parts, forces, volumes and displacements hydraulically matched, meaning that every hydraulic cylinder whether it is an Effort or Resistance set are paired up together and have all the same volumes and or displacements and are all displaced in the same overall distance and or time factor.

This said overall term is why each and every disc unit when compounded in a series with several disc units must be set up as a individual unit free working by itself and yet its product is shared progressively by all units as a series compounding unit and its given force output.

In applied mechanics and physics, the quantity of work done is defined: "If a force is not constant", then the work done equals the "average value" of the force, times the displacement of the particle parallel to the direction of the force. Efficiency, is defined as; n=W out/W in where n=efficiency/w=work.

This variable output force starts out at a higher force and with motion declines to a place where equilibrium occurs and motion stops. The uniform E and the variable R force overall velocity ratio of this invention is set up and compared with that of a conventional levers uniform E, uniform R overall velocity ratio with the same distance and or time cycle.

The Effort and Resistance forces can be modified and by test situated selectively and advantageously by the builder at primary points in, on, about, or around the Disc using proportionate add on lever arms, or various hydraulic cylinders and or various force chamber configurations on or about the periphery of the disc including the inside of the wheel or tire hydraulically.

Where the disc sits on its support base is a very important part which is its "movable fulcrum arc". This arc is a certain measured segment of the discs circumference and of which provides a controlled changing mechanical advantage and changing E and R moment arm ratio. With some modifications, the motion of the disc lever rolling on its movable fulcrum arc, effect the Resistance moment arm too actually "grow in length" while the Effort moment arm remains a constant (radius of the disc) length. This growing in length R moment arm provides for changing force velocity ratios which provides for a controlled decline of the R output forces. The longer the R moment arm is, the lesser the R force output, and it is this growing length provides a declining variable output force which started at infinity and declined to where a conventional R output force is at and stops.

Among others and in a preferred modification; the applied Effort force is connected with a pin and bushing to the axis or center of the disc unit. There are two points of Resistance output at the fulcrum at the discs bottom (shaped like an anchor) of the disc at zero degrees or infinity. These two R output forces decline alternately in a to and fro rolling motion cycle and provide alternately the growing length of the fulcrum arc to a finish of 8.113 degrees each and at opposite ends of this 8.113 degree finish growing arc. The chord of the 8.113 Degree fulcrum arc is a changing and growing left and alternating right R moment arm. The disc is ready to roll on the support base clockwise starting at infinity and growing to 8.113 degrees. Both are connected with a pin and bushing to the discs periphery (its circumference).

The inventor has found that by multiplying 0.1416×the Diameter of a circle, provides the largest natural fulcrum arc roll motion cycle available on the support base for everything pertinent to remain proportional to each other. An 8.113 degree fulcrum roll cycle is selected for displaying certain principle applied herein.

For various builders' purposes, there are other modifications in which incremental work areas large and small for the disc to work on and are found along 73 degrees (to the right or left of top dead center on the support base) of the support base and this is also for the providing of the changing E and R force velocity Ratios. This is where a reverse of the E and R points of connection to the disc is used. In the further mentioning of this preferred modification, there are two alternate points for the Applied Effort force, one at the top upper left, and one at the top upper right side of the disc lever. Both are connected operatively at the periphery. They operate alternately. The R output forces are provided at the disc axis parallel to the tangent support base.

This support base can be other then flat or of a fixed type with a generally linear configuration.

SUMMARY OF THE INVENTION

The new disc lever unit can be modified to transmit and transfer efficient compounded forces, for various machines large and small using various types of primary Effort forces for transfer.

The general purpose of the present invention is to provide a new and improved power conversion system and method, which has all the advantages of the prior art and none of the disadvantages.

As the disc continues into its given fulcrum roll cycle on its support base its E and R forces gain advantage of position.

It is important, that the claims be regarded as including such equivalent constructions insofar as they do not depart from the spirit and scope and themes of the present invention.

The main object of the present invention is to provide a power conversion system for transferring power from controlled Effort and Resistance forces of uniform and variable velocities, or a combination of variable velocity E input forces and variable velocity R output forces.

The input and output E and R forces can be compounded preferably in "series compounding" using the principals and laws of the "compound lever" with the use of several disc units in series compounding, and preferably using hydraulics, hydraulic cylinders, various hydraulic force chambers, multistage hydraulic cylinders and related components, Electro-hydraulics, accumulation tanks, atmospheric pressure reservoirs, transmission cases etc. and various mechanical applications.

In general then, to compute the mechanical advantage of any compounding machine, first find the mechanical advantage of each separate element and then find the product of the separate advantages.

DESCRIPTION OF THE PREFERRED EMBODIMENT

Figure 1:
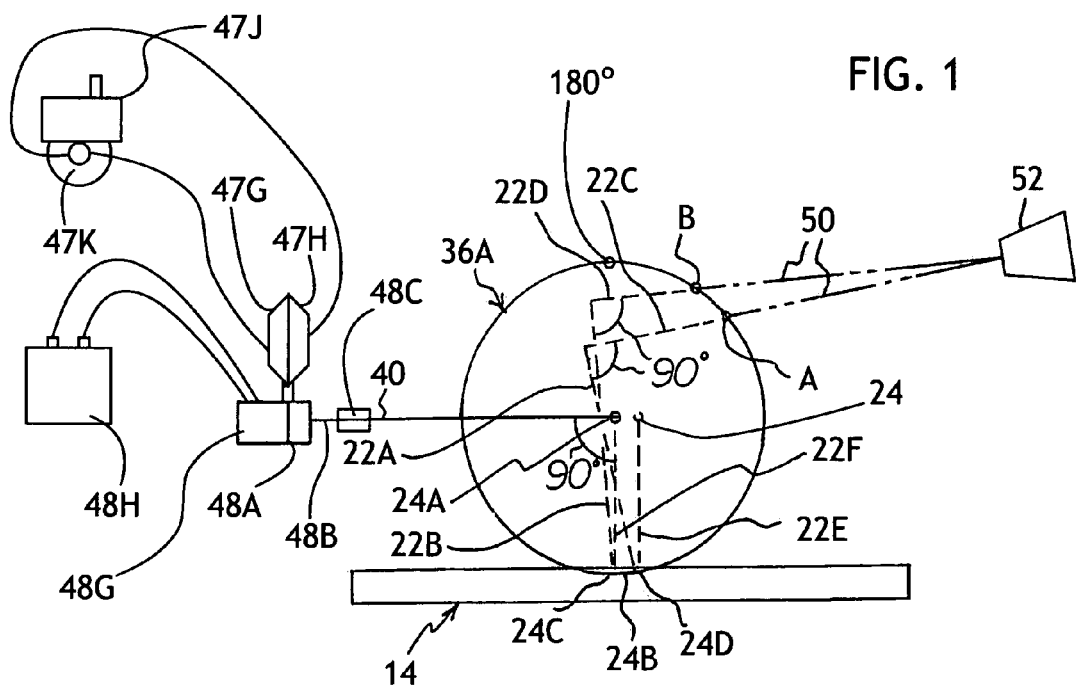
FIG. 1 is a side elevational view of a disk and its associated components as employed in the system of the present invention.

FIG. 1 illustrates a basic Diesel Electric hybrid modification with 14.125" diameter disc 22 shown in its starting position on support base 14, with its top dead center point marked 180 degrees which is the discs vertical diameter. The unit's disc gear 22 is in its starting position for a right roll cycle on its support base 14 (a left motion cycle with the same corresponding components are not shown connected in at 36a providing for a to and fro continuous motion cycle). The Effort moment arms of force are shown as 22a and 22b and are at a 90 degree angle to the E lines of force 22d and 22c.

The 1$^{st}$ attachment member 50 (shown in two positions) is connected with a pin and bushing at the discs periphery at point B (and A) and the other end connected to the pivotally mounted Effort hydraulic cylinder linear motor 52 which is a multi stage hydraulic cylinder motor and which is located 24.375" to the right of "top dead center" (and parallel to the base 14) and is a requirement needed for setting up a "proper trajectory" of the applied E lines of force 22d and 22c. The live hydraulic fluid is supplied to linear motor 52 by pump 47k (fluid line not shown) which is powered by diesel engine 47j which activates the disc 22 for a right direction roll cycle with a given and limited fulcrum roll cycle on tangent support base 14. The spent hydraulic Fluid is piped into atmospheric pressure reservoir 47h during its return trip on base 14 with a left roll cycle on support base 14.

The disc 22 has a given roll cycle on support base 14 by combining selected roll increments anywhere along a 73 degree section of support base 14. The 22e and 22f (radius) constant length start and finish R moment arms are shown which convert the effort force mechanical advantage via fulcrum arc 24b rolling on base 14, to resistances output forces via the Radius R moment arms 22f and 22e. Point 24a and 24 at the axis are the start and finish points of R output force. The 2$^{nd}$ attached member 48 powers reciprocating hydraulic force pump 48c which provides boosted live hydraulic fluid via pipe 48b to turn hydraulic motor 48a which turns output power generator 48g supplying electric currant to battery 48h which stores and supplies electric currant for completing the hybrid system. This Single disc units principles of boosted R output forces illustrated here, and these boosted output forces can be series compounded by the use of a series of these disc units placed side by side (like a roll of coins) and by the use of the laws of the compound lever provide tremendous R output forces and thereby increasing the overall units efficiency.

The 24.375" parallel location dimension can be modified by test with the moving selectively and relocating of the hydraulic linear Effort motor 52. This is done by model testing for other selected applied effort force locations, while still establishing and keeping the lines of force and respective moments of force at a 90 degree angle to each other.

Figure 2:
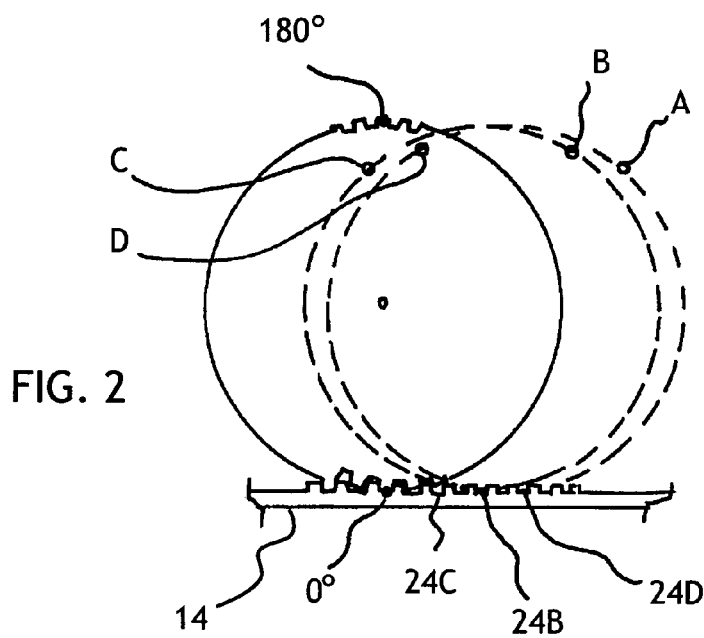
FIG. 2 is a more detailed side elevational showing of the disk illustrated in FIG. 1 along with its relationship to its supporting base.

FIGS. 1, 2, are schematic illustrations of roll cycles of the disc 22 and its fulcrum arc 24b on the support base rack 14 which has small ring gear teeth 24d matching the teeth on support base rack 14 teeth. The meshing of the teeth keeps translation of the discs fulcrum arc 24b from occurring on rack support base 14 when E and R forces are applied to the disc gear 22. Also the drawings relates to the positioning of the Disc Unit on its support base. As the disc 22 rolls left on its base 14, shown as C and D in FIG. 2 are the left side start and finish points of connection to the disc for the 3$^{rd}$ attachment member (not shown) to activate the disc 22 for the left fulcrum 24c roll cycle on support base 14.

Figure 3:
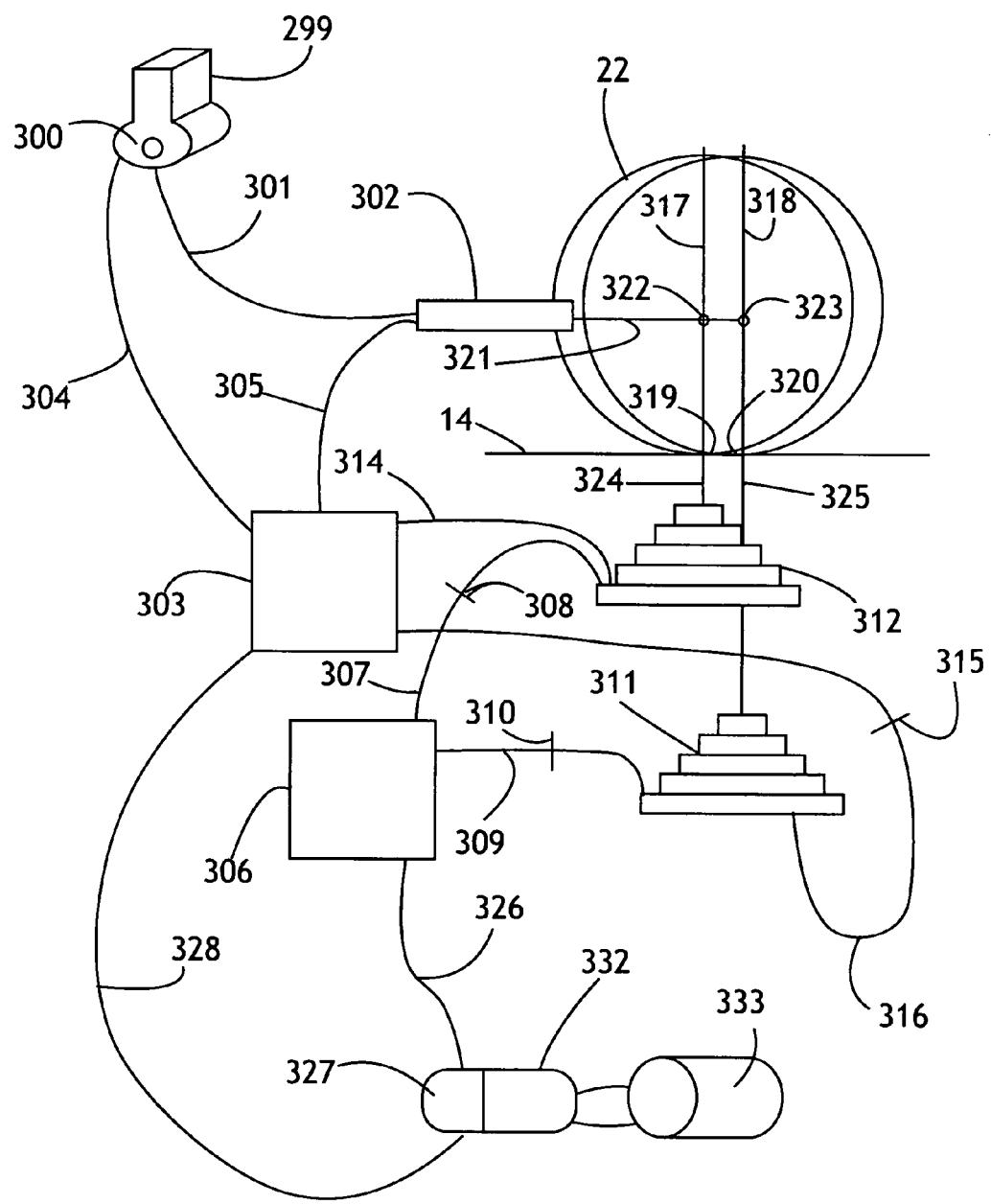
FIG. 3 is an over all showing of the power conversion system constructed in accordance with the principles of the present invention.

FIG. 3, illustrates another basic diesel Electric hybrid transmission which is a preferred modification of the disc gear 22. The Diesel Engine 299 drives hydraulic rotary pump 300 which supplies hydraulic fluid through pipe 301 of which its live fluid powers the Effort linear cylinder motor 302 by which powers attachment member 321 which is connected at the discs 22 axis at 322 with a pin and bushing which powers the disc 22 to roll in a clockwise fashion rolling on its fulcrum 319 on its support base 14. The Effort force applied at the axis is multiplied by the length of the radius Effort moment arm 317, and 318 (which remains the same length) producing an Effort mechanical advantage (EMA). The EMA with motion of the disc 22 on the base 14 is divided in increments and delivered to the multi stage R output cylinder pump 312 via attachment member 324 an alternately via attachment member 325 and multistage R cylinder 311, and this R out force is declining by the growth of the R moment arm 319 (and 320 with a left roll cycle) to a finish of an 8.113 Degree arcs chord length. The Attachment member 324 connects the fulcrum to the multistage R force pump 312 which ejects its live output force fluid variably via pipe 307 and into pressure reservoir tank 306 which supplies live Resistance output fluid through pipe 326 which powers hydraulic rotary motor 327 which turns generator 312 which drives final R output electric motor 313 for service. There are various spent fluid lines 305 and 328, which dump into the atmospheric pressure reservoir tank 303 and pipe 304, 314, 316 of which supplies hydraulic fluid to the various pumps and cylinders. There are various hydraulic control valves 315,308,310, with others and various parts and equipment not shown.

This modification is shown as a single disc unit and its output R forces will be modified and series compounded using a plurality of disc units staged together as mentioned with other units presented here.

The primary embodiment of the invention is a power conversion system for converting power from a diesel engine to an electric motor. The system comprises, in combination, a diesel engine 299 with an associated rotary pump 300 operable with the operation of the diesel engine for pumping a fluid in a path of travel. In the primary embodiment, the primary power source is a diesel engine. Other engines are adapted to be employed as the primary source such as a water wheel, solar and other alternate sources.

A disc 22 has a diameter of 18 inches with an associated linear cylinder motor 302 coupled to the disc for oscillating the disc on a planar base from a central position 8.113 degrees to a first position at a first side of a central position and from a central position 8.113 degrees to a second position at a second side of a central position. A first line 301 is for feeding fluid from the rotary pump to the motor.

A first multi stage cylinder pump 312 with an associated first attachment member 324 is operable in response to the movement of the disc to the first position and a second multi stage cylinder pump 311 with an associated second attachment member 325 operable in response to the movement of the disc to the second position. A hydraulic pressure tank 303 with a second line 305 is for feeding fluid from the cylinder motor to the hydraulic pressure tank and with third and fourth lines 314, 315 for feeding fluid from the hydraulic pressure tank to the first and second multi stage cylinder pumps.

Next provided are a hydraulic motor 327 with a mechanically coupled generator 332 and an electrically associated electric motor 333 as a final power output. Such final output is adapted to be a product of other means such as a hydraulic motor or the like. The generator and electric motor are operable in response to the operation of the hydraulic motor. A pressure tank 306 and fifth and sixth lines 307, 309 are for feeding fluid from the first and second multi stage cylinder pumps to the pressure tank. A seventh line 326 is for feeding fluid from the pressure tank to the hydraulic motor for powering the generator and the electric motor.

In an alternate embodiment of the invention where plural disks are employed, plural pressure tanks, step up pressure tanks, are also employed with associated systems and related control valves.

An eighth line is for returning fluid from the generator to the hydraulic pressure tank and a ninth line 304 for supplying fluid from the hydraulic pressure tank to the rotary pump.

Lastly, a hydraulic control valves 214, 315, 308, 310 is in the third, fourth fifth and sixth lines.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power conversion system for converting power from a diesel engine to an electric motor comprising, in combination:

a diesel engine with an associated rotary pump operable with the operation of the diesel engine for pumping a fluid in a path of travel;

a disc having a diameter of 18 inches with an associated linear cylinder motor coupled to the disc for oscillating the disc on a planar base from a central position 8.113 degrees to a first position at a first side of the central position and from the central position 8.113 degrees to a second position at a second side of the central position, and with a first line for feeding fluid from the rotary pump to the motor;

a first multi stage cylinder pump with an associated first attachment member operable in response to the movement of the disc to the first position and a second multi stage cylinder pump with an associated second attachment member operable in response to the movement of the disc to the second position, and a hydraulic pressure tank with a second line for feeding fluid from the cylinder motor to the hydraulic pressure tank and with third and fourth lines for feeding fluid from the hydraulic pressure tank to the first and second multi stage cylinder pumps;

a hydraulic motor with a mechanically coupled generator and an electrically associated electric motor as a final power output with a pressure tank and fifth and sixth lines for feeding fluid from the first and second multi stage cylinder pumps to the pressure tank and a seventh line for feeding fluid from the pressure tank to the generator for powering the generator;

an eighth line for returning fluid from the hydraulic motor to the hydraulic pressure tank and a ninth line for supplying fluid from the hydraulic pressure tank to the rotary pump; and hydraulic control valves in the third, fourth, fifth and sixth lines.

* * * * *